March 25, 1969  P. G. FRISCHMANN  3,434,349
ELECTRONIC CLINICAL THERMOMETER
Filed Oct. 24, 1965

Inventor:
Peter G. Frischmann, by
His Attorney.

United States Patent Office 3,434,349
Patented Mar. 25, 1969

3,434,349
ELECTRONIC CLINICAL THERMOMETER
Peter G. Frischmann, Scottsdale, Ariz., assignor to General Electric Company, a corporation of New York
Filed Oct. 24, 1965, Ser. No. 504,472
Int. Cl. G01k 5/18
U.S. Cl. 73—361    4 Claims

ABSTRACT OF THE DISCLOSURE

A thermocouple thermometer for clinical use in which the reference thermocouple is maintained at 98.6° F. by a self-regulating constant-temperature bath which includes a mixture of carbon black and paraethylphenol having electrical conduction properties to maintain the bath at 98.6° F. The device also includes a switching arrangement to sterilize the sensing thermocouple.

---

This invention relates to an electronic clinical thermometer incorporating a thermocouple and a reference temperature bath therefor.

A switching element is described in U.S. Patent No. 3,138,686, issued June 23, 1964, which includes a core comprising a porous material saturated with a chemically inactive insulating spacer containing sulfur and carbon black. This patent is assigned to the same assignee as the present application.

Heretofore clinical thermometers have usually been made of glass and had a mercury column therein. Devices of this type are breakable and require a substantial length of time for the mercury to come to thermal equilibrium. Thermocouples have long been used to measure temperature. Heretofore there have been no successful thermocouple thermometers that have been small enough to be readily portable, the principal drawback in these thermocouples being the provision of a satisfactory constant temperature reference.

It is an object of this invention to provide a portable electronic clinical thermometer.

It is another object of this invention to provide a clinical thermometer that will indicate immediately the temperature of the sensing thermocouple.

It is a further object of this invention to provide a constant temperature bath for the reference thermocouple that is compact, reliable and does not need to be replenished.

It is a still further object of this invention to provide a bath of known melting point that will not heat beyond its melting point.

The various features of novelty which characterize the invention are pointed out with particularity in the claims annexed to and forming part of this specification. For a better understanding of the invention, however, its advantages and specific objects obtained with its use, reference is made to the accompanying drawings and descriptive matter in which is illustrated and described a preferred embodiment of the invention.

In the drawings

Figure 1:
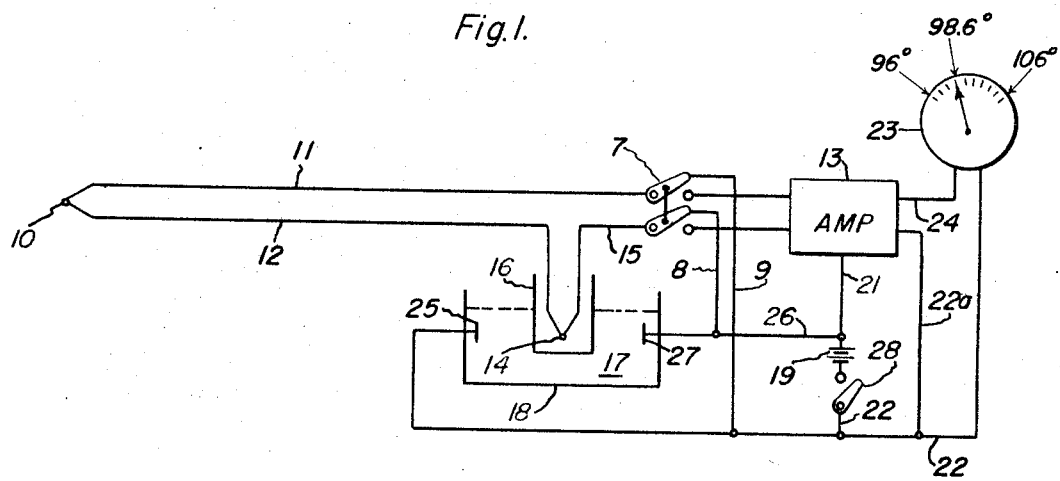
FIG. 1 is a schematic wiring diagram of an electronic clinical thermometer.

The electronic clinical thermometer is represented diagrammatically in FIGURE 1 and comprises a sensing thermocouple 10 having the leads 11 and 12 therefrom. The lead 11 is connected to the amplifier 13 through switch 7. The lead 12 is connected to one side of the reference thermocouple 14. The other lead 15 of this thermocouple is connected to the amplifier also through switch 7. The thermocouple 14 is electrically insulated from the heating circuit by a sheath 16 which is immersed in the constant temperature bath 17 retained within the container 18.

A source of energy 19, such as a one and one-half volt electric flashlight battery supplies the power and is connected by means of the lead 21 to the amplification unit and by the lead 22 to the indicator dial 23. A connection 22a is also provided. The indicator dial 23 is connected to the amplification unit by means of the lead 24. An extension of the lead 22 connects the source of power to the electrode 25, shown in FIG. 2, and a lead 26 connects the electrode 27 through lead 21 with the source of power 19.

By means of a switch 7 and leads 8 and 9, thermocouple 10 may be connected to battery 19 with the result that leads 11 and 12 and the thermocouple are resistance heated and sterilized before and after use.

The bath 17 is composed of a mixture of one part by weight of carbon black and three parts of paraethylphenol, which has a melting point of 98.6° F., which temperature is selected as a convenience and is not critical. When this mixture is melted and poured into the container 18, shown in FIG. 2, and allowed to cool below its melting point, it will crystallize and the carbon black will be ejected along the crystal grain boundary and forms a continuous conductive path between the electrode 25 and the electrode 27. When current is passed between these electrodes the carbon black acts as a resistance conductor and generates heat until the paraethylphenol begins to melt. The carbon black is then coated with this material and the resistance increases. This causes the bath 17 to remain at the temperature of its melting point of 98.6° F. As heat is removed without temperature change, crystallization commences and the resistance drops to the point where current will again flow in the bath. That is, as the temperature tends to decrease, R decreases, and $E^2/R$ (power) increases, and the temperature tends to rise. Thus, the bath reaches a constant temperature.

Figure 2:
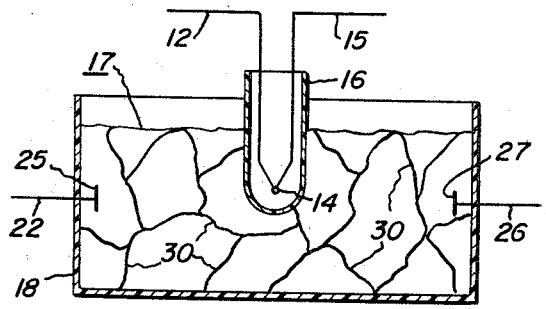
FIG. 2 is an enlarged view of the reference thermocouple and the constant temperature bath associated therewith.

When the switch 28 in the lead 22 is closed and the source of power 19 is then connected through the lead 22 to the electrode 25 and through the lead 26 to the electrode 27, current will then flow between the electrodes 25 and 27, through the carbon black 30 along the crystal boundary, as shown in FIG. 2, until such a time as the temperature of the bath reaches the melting point. At this temperature, the crystals will melt, the current will decrease. Also, upon closing switch 22, power is applied to amplifier 13.

The sensing thermocouple 10 is inserted in a body cavity and the difference in temperature between the thermocouple 10 and the thermocouple 14 is indicated through the amplifying unit 13 on the indicator dial 23, which is so calibrated that when the two thermocouples 10 and 14 are at the same temperature a temperature of 98.6° F. will be indicated on the dial. When the sensing thermocouple 10 is lower, such as 96° F., 96 will be indicated on the dial and when the temperature is higher, such as 106° F., this temperature will be indicated on the dial.

Insofar as all thermocouple temperatures are indicated by comparison of the sensing therocouple to the reference thermocouple, the accuracy is controlled by the accuracy of the temperature of the reference thermocouple 14.

The sensing thermocouple 10 may be made of very fine elements such as wires having a diameter of 0.01 inch. Current from the energy source may be used to sterilize these wires by $I^2R$ heating.

The thermocouple used in this thermometer may be made from Chromel-Alumel, Copper Constantan, or any other metals that are suitable for thermocouples.

While in the above description a sheath 16 is used as an example of a method of protecting the reference thermocouple 14, it is also contemplated that this thermocouple may be protected from the bath 17 by a coating of plastic or other suitable material, such as glass.

While in the above description, paraethylphenol is used as an example, 1,2-dichloronaphthalene also has a melting point of 98.6° F. and acts in the same manner when mixed in the said proportion with carbon black.

The conductive material referred to in the above example is carbon black and is the preferred material. It has been found that although carbon black is the preferred material that acetylene black, lamp black, and a number of finely-divided graphites are suitable. Additionally, colloidal particles of tungsten and nickel can be used as a conducting material.

It has been found that small weight percentage range, such as 3 percent to 4 percent conductive material, is the optimum concentration in the resistor composition, considering both a low resistance at low temperature and a large resistance differential between low and high temperatures.

While in the above examples paraethylphenol and 1,2-dichloronaphthalene have been used, principally because of their melting point, which is approximately 98.6° F., any insulating material may be used having an appropriate melting point that does not react with the conductive material or with the electrodes that will eject the conductive material along the crystal boundary on cooling to form a resistor unit capable of conducting the current necessary to heat the composition.

While in accordance with the provisions of the statute, the best forms of embodiment of this invention now known have been illustrated and described, it will be apparent to those skilled in the art that changes may be made in the forms of the apparatus disclosed, without departing from the spirit of this invention, as set forth in the appended claims; and in some cases, certain features of this invention may be used to advantage without a corresponding use of other features.

What I claim as new and desire to secure by Letters Patent of the United States is:

1. In an electronic clinical thermometer including a sensing thermocouple to be inserted in a body cavity, a reference thermocouple, an indicator calibrated for direct readout of the temperature of the sensing thermocouple, an amplification unit operatively associated with the sensing thermocouple and the reference thermocouple to amplify signals generated by said thermocouples during use of the thermometer, and an electric power source connected to the amplification unit, the combination therewith of self-regulating electrical resistance-heated constant temperature means for establishing and maintaining the reference thermocouple at a constant temperature approximating normal body temperature, said means comprising a pair of electrodes, a variable-resistance mixture of finely-divided conductive material and a crystalline insulating material having a melting point temperature approximating normal body temperature disposed between and in contact with said electrodes and receiving said reference thermocouple, and switch means to connect said electrodes to the said electric power source.

2. The thermometer as described in claim 1 in which the variable-resistance mixture comprises three parts paraethylphenol and one part carbon black.

3. The thermometer as described in claim 1 in which the variable-resistance mixture comprises three parts 1,2-dichloronaphthalene and one part carbon black.

4. In an electronic clinical thermometer including a sensing thermocouple to be inserted into a body cavity, a reference thermocouple, an indicator calibrated for direct readout of the temperature of the sensing thermocouple, an amplification unit operatively associated with the sensing thermocouple and the reference thermocouple, to amplify signals generated by said thermocouples during use of the thermometer, an electric power source connected to the amplification unit, and a constant temperature means for maintaining the reference thermocouple at a constant temperature approximating normal body temperature, the combination therewith of sensing thermocouple sterilizing means comprising a switch electrically connected to the sensing thermocouple and to the electric power source for delivering current to the sensing thermocouple and thereby causing it to be resistance-heated and sterilized after each use of the thermometer.

References Cited

UNITED STATES PATENTS

| 1,367,122 | 2/1921 | Chubb et al. | 219—200 |
| 2,546,276 | 3/1951 | Redding. | |
| 2,640,089 | 5/1953 | Gilbert | 73—361 X |
| 2,640,357 | 6/1953 | Stephenson | 73—361 |
| 2,897,332 | 7/1959 | McFarlane et al. | 219—209 X |
| 3,138,686 | 6/1964 | Mitoff et al. | 252—502 X |
| 2,417,923 | 3/1947 | Frisk | 73—361 |

FOREIGN PATENTS 1,005,459  9/1965  Great Britain.

LOUIS R. PRINCE, *Primary Examiner.*

FREDERICK SHOON, *Assistant Examiner.*

U.S. Cl. X.R.

219—209